350-396 SR

XR 3,371,324

CROSS REFERENCE SEARCH ROOM

Feb. 27, 1968 N. SINOTO 3,371,324

LIGHT-MODULATING INFORMATION STORAGE AND RETRIEVAL SYSTEM AND METHOD

Filed Nov. 25, 1964 4 Sheets-Sheet 1

INVENTOR:
NORI SINOTO

BY

Curtis, Morris & Safford
ATTORNEYS.

INVENTOR:
NORI SINOTO
BY
Curtis, Morris & Safford
ATTORNEYS.

INVENTOR.
NORI SINOTO
BY
Curtis, Morris & Safford
ATTORNEYS

Feb. 27, 1968 N. SINOTO 3,371,324

LIGHT-MODULATING INFORMATION STORAGE AND RETRIEVAL SYSTEM AND METHOD

Filed Nov. 25, 1964 4 Sheets-Sheet 4

INVENTOR:
NORI SINOTO

BY

Curtis, Morris & Safford
ATTORNEYS.

United States Patent Office 3,371,324
Patented Feb. 27, 1968

3,371,324
LIGHT-MODULATING INFORMATION STORAGE AND RETRIEVAL SYSTEM AND METHOD
Nori Sinoto, 345 W. 58th St., New York, N.Y. 10019
Filed Nov. 25, 1964, Ser. No. 413,911
26 Claims. (Cl. 340—173)

ABSTRACT OF THE DISCLOSURE

Information is stored in arrays of light-modulating elements such as polarizers having their axes of polarization arranged in accordance with a predetermined code. The information is retrieved by projecting light beams polarized in a similarly coded pattern onto the storage arrays. Each beam strikes several polarizing elements simultaneously so that a large number of elements can be scanned at the same time. When the retrieval light beam arrangement matches that of a particular array, each of the elements in the array will have its polarization axis aligned with that of the light beam striking it. This condition in a particular array is detected by means such as a bank of photocells, and the array thus is identified as containing the desired information. In the method of the invention, the system is used to retrieve information on the basis of a key word used in the title or description of a subject being investigated. Each key word is encoded by preparing a projection slide or other storage means with a coded polarization pattern, and light is projected through each key word slide onto the storage arrays. Each array which has one or more of the key words is identified by the storage and retrieval system.

This invention relates to systems and methods using optical means for storing and retrieving information.

It is a major object of the present invention to produce a simple, inexpensive and rapid system for storing and retrieving information. Among the many previous systems which have been proposed for meeting this object are a number of optical systems using aperture- and image-matching principles, including those shown in U.S. Patents 3,125,683, 3,130,305, and 3,018,689. The system and method of the present invention avoid many of the problems of such prior systems by the superposition of modulated light signals in a highly unique and simple arrangement.

In one embodiment of the invention, modulation of the light signals is accomplished by polarization. The polarization of light has been used to perform logic functions in the past, as is shown, for example, in U.S. Patents 2,928,075 and 3,121,866. However, the arrangements disclosed in such patents do not resemble applicant's invention and are believed to be impractical.

It is therefore, another object of the present invention to provide a truly practical and simple information storage and retrieval system and method utilizing the modulation of light, and particularly the polarization of light, in performing logic functions.

One particularly perplexing information handling problem has been the identification and location of information pertaining to a given subject. For example, a system which would quickly provide a list of all the articles or texts on a given subject would be a boon to literature research. To date, there is no known system which is totally satisfactory for this purpose.

Thus, it is another object of the present invention to provide a quick and thorough system and method for storing and retrieving information pertaining to a given subject.

The drawings and description that follow describe the invention and indicate some of the ways in which it can be used. In addition, some of the advantages provided by the invention will be pointed out.

Figures 1, 2, 3, 4:
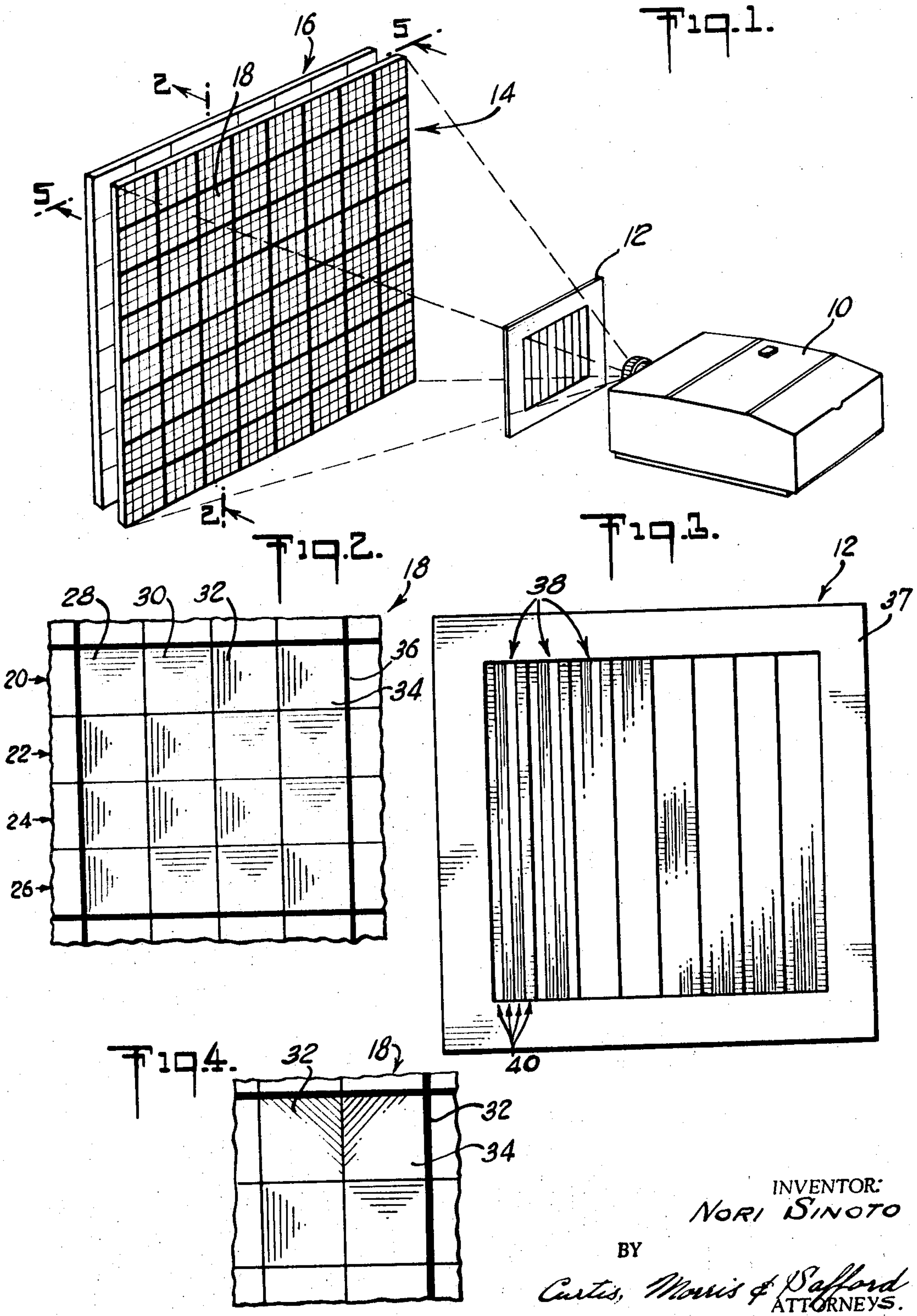
FIGURE 1 is a perspective view of information storage and retrieval apparatus of the present invention.
FIGURE 2 is a broken-away elevation view, taken along line 2—2, of a portion of the apparatus shown in FIGURE 1.
FIGURE 3 is an elevation view of another portion of the apparatus shown in FIGURE 1.
FIGURE 4 is a broken-away elevation view, similar to FIGURE 2, of an alternative embodiment of the FIGURE 2 structure.

The invention probably can be best understood by referring to FIGURE 1. The information storage and retrieval system includes a light projector 10 including a light source and lens system, an information retrieval slide 12, an information storage unit panel 14, and a read-out board 16 positioned behind the information cell panel 14.

Each item of information to be handled by the system shown in FIGURE 1 is stored in one of a number of storage cells or units 18 and the cells 18 are grouped together to form information cell panel 14. The projector 10 and retrieval slide 12 are used, together with read-out board 16, to retrieve information stored in the cells 18.

Referring now to FIGURE 2, each information cell 18 comprises four horizontal arrays 20, 22, 24 and 26 each comprising four tiny squares 28, 30, 32 and 34 of light-polarizing material such as "Polaroid" plastic light-polarizing material sold by the Polaroid Corporation. Each square is secured to a transparent backing material such as glass. An opaque border 36 separates individual ones of the information cells 18 from one another. Both the number of arrays in an information cell and the number of light-polarizing elements in each array may be varied in accordance with the requirements imposed upon the system by the particular use to which it is to be put.

Each polarizing square can be made of either plane- or circular-polarizing materials, but plane-polarizing material is preferred. In FIGURE 2, the plane or axis of polarization of each square is indicated by the parallel lines in each square. In an alternative embodiment of the invention, which will be described hereinbelow, these parallel lines represent planar light-modulating lines.

The squares in each horizontal array are arranged with their axes either parallel or perpendicular to the axis of the other squares in the row, in a binary code pattern. For example, ordinary light passing through squares 28 and 30 is polarized in a horizontal plane while light passing through squares 32 and 34 is polarized in a vertical plane.

Each horizontal array or row of light-polarizing elements represents a word which is descriptive of the information stored in the cell 18. Thus, there is room for storage of four identifying words in each cell 18.

Referring now to FIGURES 1 and 3, the retrieval slide 12 includes a frame 37 and a plurality of vertical columns 38 of light-polarizing material. The number of columns 38 equals the number of columns of information cells 18 on panel 14.

Each column 38 includes four sub-columns 40, each of which is polarized in accordance with a binary code representation of a key word whose presence in one or more of the information cells 18 is desired to be detected. The arrangement of polarizing strips 40 is the same in each column 38 in a given retrieval slide.

The FIGURE 1 system operates as follows: Ordinary white light si projected from the projector 10 through retrieval slide 12 and onto information cell panel 14. Each vertical polarizing sub-column or strip 40 on retrieval slide 12 is aligned so that it precisely covers one complete vertical column of individual polarizing elements on information cell panel 14. When the axis of polarization of the light striking a particular cell element is the same as the axis of polarization of the element itself, light is transmitted through the element with relatively undiminished intensity. For example, light polarized through two strips of "Polaroid" material having parallel axes of polarization has between 30 and 40 percent of its original intensity. On the other hand, if the axes of polarization of the incident light and the cell element are 90 degrees apart, the light transmitted through the cell element will be negligible; i.e., the light will be "extinguished." Thus, each horizontal information cell array illuminated will consist of a coded pattern of "light" and "dark" (light-transmitting and light-blocking) elements.

It is preferred that the above-described system provide a read-out or detection signal indicating the detection of an information cell containing the desired information when there is substantially equal transmission of light by all of the elements in any horizontal array of any information cell. Thus, it is preferred that a read-out be given when all of the elements in a horizontal array have either maximum or minimum transmission of the incident light, that is, when all elements are either "light" or "dark." This read-out can be provided by the human eye since each polarizing element is readily viewed as either a dark or light spot. However, it is preferred that electrical means be provided to detect the matching of the incident light pattern with a horizontal array.

Read-out board 16 (see FIGURE 5) is adapted to provide an electrical output signal in response to each detection of an information cell having at least one horizontal array whose elements are all "lighted." The board 16 includes a number of identical read-out cells 42, one read-out cell being provided for every storage cell on panel 14. Each read-out cell is positioned directly behind its corresponding storage cell.

Each read-out cell 42 includes four rows 44, 46, 48 and 50 of photoconductive segments 52. Each of these segments 52 is positioned behind a corresponding light-polarizing element of a storage cell 18. Each photoconductive segment 52 is made of a photoconductive material such as selenium or cadmium sulfide which has a very high resistance in the dark but which has a very low resistance when exposed to bright light.

A direct voltage is applied at terminal 54 to a metallic conductor strip 56 which contacts the right edge of each array of segments 52. A connection is made to the opposite end of each of these arrays through another conductor strip 58 which is connected to a read-out circuit 60. A conductive return path between strips 56 and 58 is provided by read-out circuit 60. Thus, a direct voltage is applied across each horizontal row of photoconductive segments 52. Whenever at least one of the segments 52 in each of the rows is either not illuminated or illuminated with light of relatively weak intensity, the total resistance from one side of each row to the other is high and the current flow between conductors 56 and 58 is small. However, when all of the segments 52 in a row are illuminated with relatively bright light, they provide a relatively low resistivity path for current to flow between conductors 56 and 58, thus developing a sudden increase in current flow from conductor 58 to the read-out circuit 60. Read-out circuit 60 uses conventional electrical level detector circuitry to provide an output signal for an information cell if and only if the current output from the cell reaches or exceeds a predetermined level corresponding to maximum illumination of each segment 52 in at least one horizontal segment array. The output signals can be used to light indicator lamps or actuate other equipment to indicate visually which of the information cells has the desired information.

Insulation strips 62 are positioned between adjacent horizontal rows of segments 52, and similar insulation strips 64 insulate the read-out cells 42 from one another. A single conductive strip 56 serves as the positive terminal for all of the read-out cells in a vertical column, but each cell 42 has its own negative terminal 58 insulated from the negative terminal 58 of the adjacent cell by an insulating strip 64. An individual lead-wire is connected to each strip 58. Wherever necessary, such lead-wires are passed through insulated holes in the board 16 to emerge from its rear surface. The board circuitry is conveniently formed upon an insulating backing by conventional printed-circuit manufacturing techniques.

Figure 13:
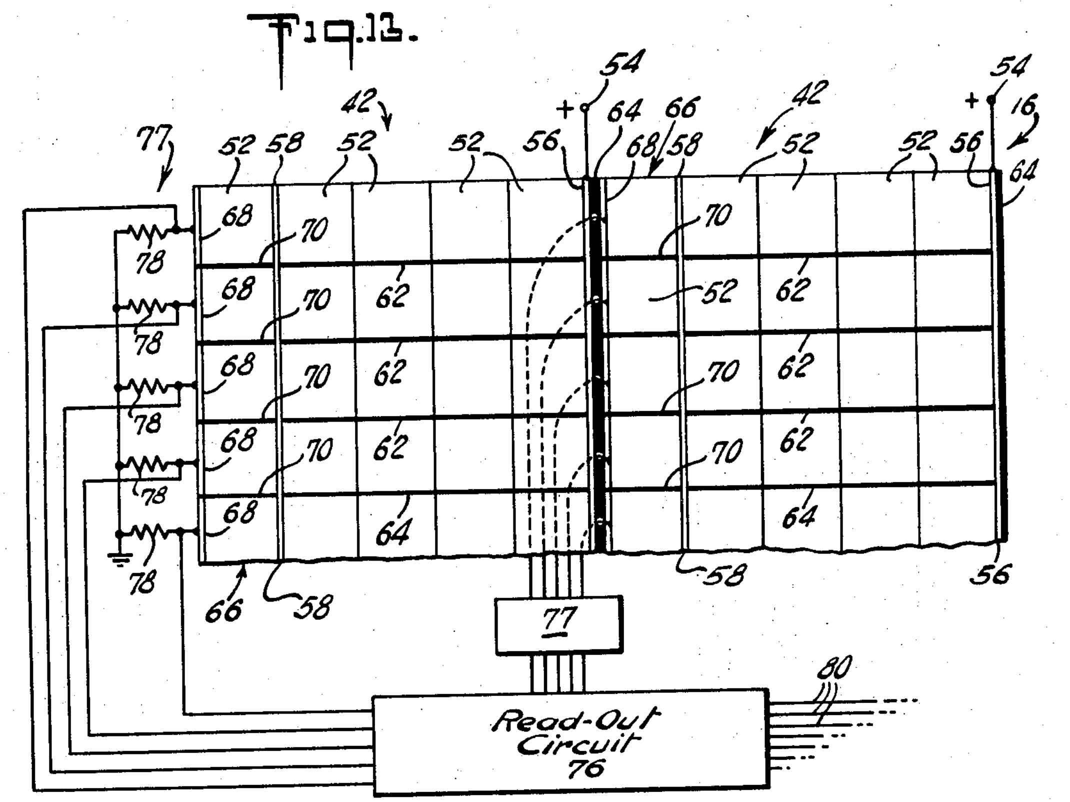
FIGURE 13 is a broken-away elevation of an alternative embodiment of the FIGURE 5 structure.
Figure 14:
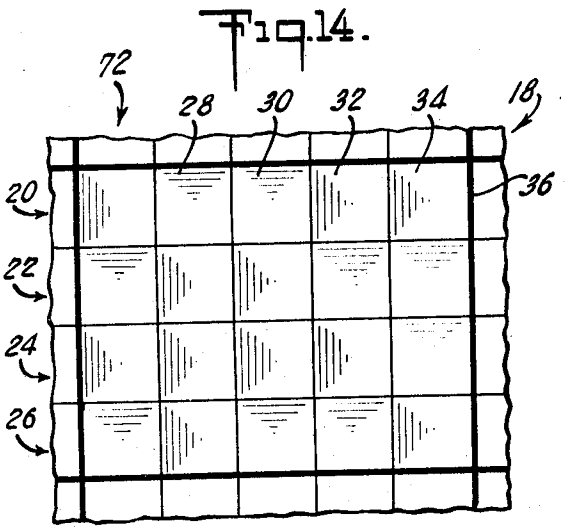
FIGURE 14 is a broken-away elevation view of an alternative embodiment of the FIGURE 2 structure.
Figure 15:
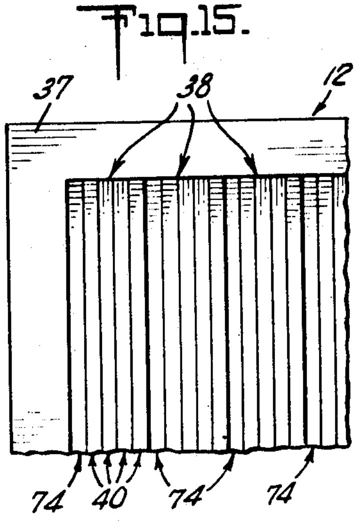
FIGURE 15 is a broken-away elevation view of an alternative embodiment of the FIGURE 3 structure.

A modified read-out board 16, a modified information cell 18, and a modified retrieval slide 12 for use with the modified read-out board 16 are shown, respectively, in FIGURES 13, 14 and 15.

Figure 5:
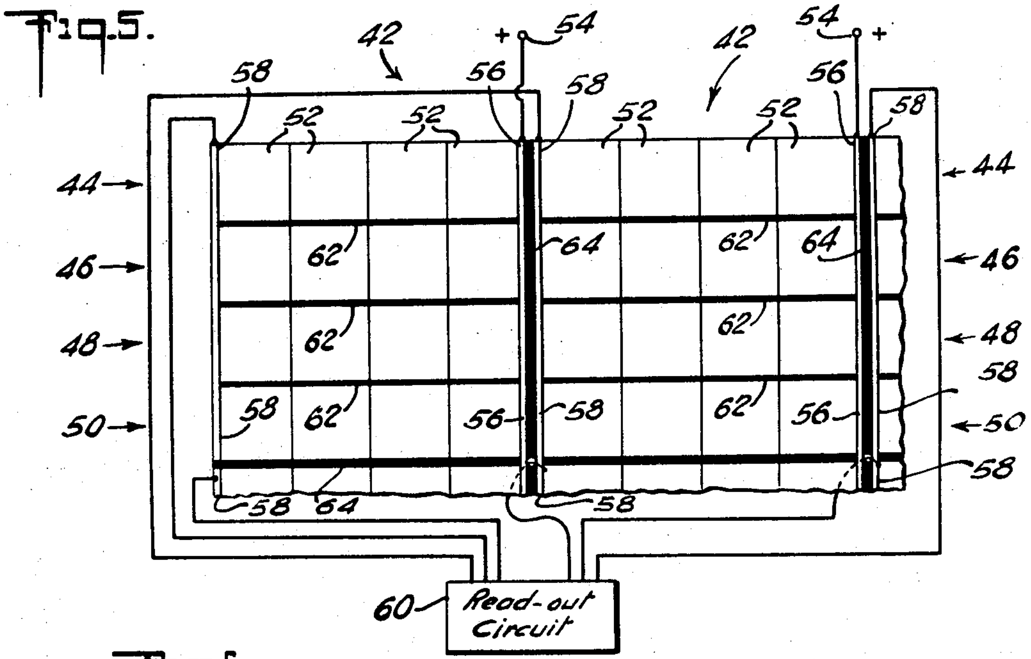
FIGURE 5 is a broken-away elevation view of another component of the apparatus shown in FIGURE 1.

The read-out board shown in FIGURE 13 is identical to the one shown in FIGURE 5 except that it is adapted to provide a unique, parallel-form digital coded electrical output signal for each separate information cell so that the information cell which has been detected can be identified uniquely. This is accomplished by adding to each read-out cell 42 of the FIGURE 5 structure a vertical column 66 of photoconductive segments 52 each of whose right edge contacts conductor 58 and has an individual terminal conductor 68 at its left edge. Insulating strips 70 insulate adjacent segments 52 and contacts 68 from one another.

Referring now to FIGURE 14, the information cell 18 shown in FIGURE 14 is identical to that shown in FIGURE 2 except that a vertical column 72 of light-polarizing elements is added at the left of the existing columns of elements shown in the FIGURE 2 structure. Similarly, the retrieval slide 12 shown in FIGURE 15 is identical to that shown in FIGURE 3 except that a vertical sub-column 74 is added to the four sub-columns 40 of each main column 38 of the retrieval slide 12 shown in FIGURE 3.

Within each slide 12, the polarization of different ones of sub-columns 74 can be varied in accordance with a code to give an even greater number of available output signals. In such a system, the particular column on panel 14 in which each cell is located would determine the code used for its column 72 of elements. However, corresponding sub-columns 74 in all of the slides 12 used in a complete information handling system should have the same axis of polarization. The arrangement of polarized elements in each column 72 in information cell 18 is unique to that particular information cell. Thus, light will be transmitted through sub-column 74 of slide 12 and cell column 72 of cell 18 onto the column 66 of photoconductive segments in a coded pattern which is unique for each individual information cell.

A separate output lead is connected from each terminal 68 of each segment in column 66 to a read-out circuit 76. A resistance network 77 is connected to terminals 68 of array 66. In network 77, an identical resistor 78 is connected to each terminal 68 and its opposite end is connected to ground. A direct voltage is applied between terminal 54 and ground.

This arrangement constitutes a photo-sensitive voltage-divider circuit which operates as follows:

When none of the horizontal arrays of segments 52 between conductors 56 and 58 has all of its elements fully illuminated, the total resistance between conductors 56 and 58 will be relatively high. Hence, the voltage drop between those two conductors also will be relatively high and the voltage drop between conductor 58 and ground will be relatively low. The read-out circuit 76 is provided with conventional voltage level detectors which will provide output signals over output leads 80 if and only if the voltage on the leads connected to terminals 68 rises to a certain predetermined level. Hence, when fewer than all of the elements in all the arrays is fully illuminated, the voltage on the leads connected to terminals 68 will be insufficient to cause read-out circuit 76 to develop output signals over output leads 80. However, when all of the segments 52 are fully illuminated in any one of the horizontal arrays of elements between conductors 56 and 58, the resistance between those conductors drops substantially, the voltage between them drops, and the voltage between conductor 58 and ground increases correspondingly. However, the voltage level detectors in read-out circuit 76 are set so that they still will produce an output signal if and only if the segment in column 66 to which the detector is connected also is fully illuminated so as to cause a maximum voltage to appear at the terminal 68 of that particular segment. Thus, a read-out signal will be provided at the output leads 80 which corresponds to the coded pattern of illumination of the segments in each column 66 of each read-out cell 42. As was explained above, this pattern is determined by the unique arrangement of polarizing elements in column 72 of the information cell shown in FIGURE 14. Each information cell has its own uniquely coded column 72, and produces a coded output which distinguishes it from the other information cells.

The above-described read-out arrangement has substantial advantages, especially when it is used in connection with embodiments of the invention, to be described below, in which a large number of information cells are moved past the read-out board 16 sequentially. It should be understood that the encoded identifying signals thus produced may be stored, visually displayed, or otherwise acted upon by conventional information-handling equipment to provide visual read-out of the identification of the information cells containing the desired information. For example, each identifying signal can be converted into decimal form and can be printed-out on a paper record sheet, or can be displayed on a cathode ray tube.

It should be understood that although the above-described information storage and retrieval system uses the binary code, neither it nor any of the embodiments described herein is limited to using binary numbers. For example, the information cell shown in FIGURE 4 incorporates polarizing elements having polarization axes aligned at 0°, 45°, 90°, and 135° with respect to horizontal, thus making it capable of storing information in a quaternary-coded pattern. In this arrangement, each vertical sub-column 40 of each column 38 of retrieval slide 12 has a polarization axis aligned at one of the above four angles, in accordance with the same quaternary code. Each information cell element will transmit the maximum amount of light only when the axis of the polarized light striking it is parallel to the axis of the element. Since read-out board 16 produces an output signal only when all segments of at least one of its horizontal arrays of segments is fully illuminated, a read-out signal will be produced for a given information cell only when the coded pattern of the cell elements is the same as that of the incident light beams.

Similarly, information cells and retrieval slides using polarizing segments having polarizing axes aligned at ten different angles will provide a decimal storage and retrieval system. It is possible to use even higher-order numbering systems for encoding. Since the amount of information that can be stored in a given volume increases with the order of the numbering system used, the ability of systems in accordance with the invention to use a high-order numbering system is a distinct advantage.

The polarizing elements of the information cells 18 and the sub-columns of retrieval slide 12 can be made by cutting tiny squares and strips of "Polaroid" material and securing them to a transparent backing. "Microtome" slicing equipment, which is commonly used to cut small specimens for microscopic examination, can be used to advantage for this purpose. Other simple manufacturing methods include automatic punching operations in which the individual sub-columns and elements are punched in sequential operations from separate sheets of "Polaroid" material, each sheet having a different polarizing axis. Alternatively, these structures can be formed by means of the well known "Vectograph" process developed by Polaroid Corporation and fully described in the literature published by that company. In forming information cells using the quaternary coding system, two separate sheets may be secured together, each sheet having "Vectograph"-formed elements on both sides. All elements on each of the four sides have one of the four different polarizing axes. Information cells and retrieval slides made in any of the above ways can be made in extremely small sizes, thus making the information storage equipment quite compact.

Figures 6, 7, 8:
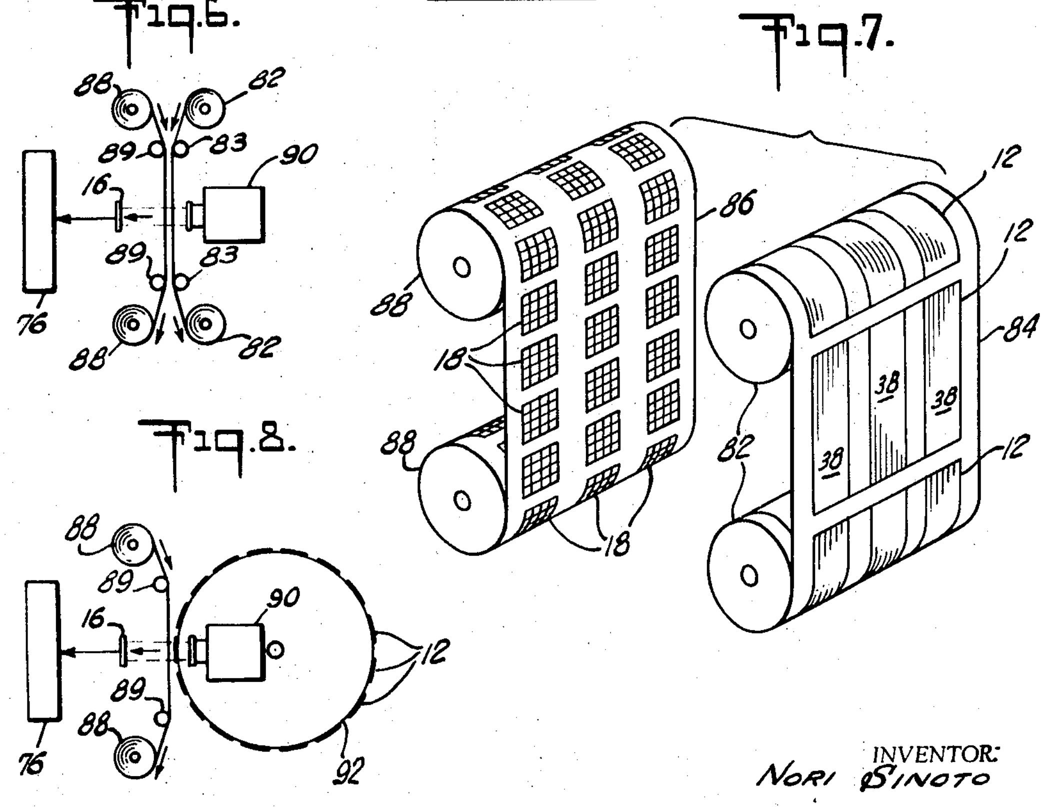
FIGURE 6 is a schematic view of another embodiment of the information storage and retrieval apparatus of the present invention.
FIGURE 7 is a perspective view of some components of the device shown in FIGURE 6.
FIGURE 8 is a schematic view of another embodiment of the information storage and retrieval apparatus of the present invention.

Another embodiment of the information storage and retrieval system of the present invention is shown in FIGURES 6 and 7. In this embodiment, a plurality of retrieval slides 12 is stored on reels in the form of a roll 82. Each individual retrieval slide 12 is fitted into an aperture in a flexible film backing member 84. Information cells 18 similarly are mounted in apertures in a film backing member 86 which is stored on reels in a roll 88. (Note that the rolls 82 in FIGURE 7 have been rotated 180 degrees from their position as shown in FIGURE 6 in order to more easily illustrate the slide 12 on the film.) A projector 90 is positioned to project a beam of ordinary white light through a retrieval slide 12 in roll 82 and then, without magnification, projects the light polarized by slide 12 simultaneously upon nine information cells 18. Each column 38 of each retrieval slide 12 has vertical sub-columns of polarizing material as described above and provides a coded pattern of light transmission through the information cells 18. This pattern is projected upon a read-out board 16 preferably such as that shown in FIGURE 13, which is connected to the read-out circuit 76 and the associated equipment described in connection with FIGURE 13.

In operation, film 84 is driven by drive rollers 83 until the desired retrieval slide is positioned in front of projector 90. Then film 86 is driven rapidly by drive rollers 89 through the beam of polarized light passing through the selected retrieval slide. Each information cell containing the desired information will be identified by a coded electrical output signal as described above. This process may be repeated as often as desired so as to identify all cells containing each of several different key words. Alternatively, light can be projected through two or more retrieval slides simultaneously, thus identifying all of the cells containing two or more different items of information with only one pass of the cell film 86 past the retrieval station.

It should be understood that it is desirable to stop the motion of roll 88 of information cells periodically to provide "exposure" of the read-out board 16 while the film is stationary. This is desirable because the retrieval slide and information cells should be properly aligned with one another when the board 16 is "exposed." Otherwise an ambiguous output may result. A shutter should be provided to cover the read-out board 16 while information cell film 86 is traveling from one exposure position to the next. Such periodic motion can be provided, for example, by ordinary motion-picture film transport apparatus. Alternatively, the film 86 may be moved continuously and the electrical read-out circuitry 76 can be adapted to be deactivated at all times except for each instant when one or more information cells is properly aligned with the retrieval slide.

FIGURE 8 illustrates a modification of the system shown in FIGURES 6 and 7. The FIGURE 8 arrangement is identical to the FIGURES 6 and 7 arrangement except that the retrieval slides 12 are mounted on the surface of a drum 92 made of transparent material. The drum is rotated until the desired retrieval slide is positioned in front of the projector 90, and the above-described information cell-scanning takes place. This arrangement is simple, compact, and trouble-free.

Figures 9, 10, 11, 12:
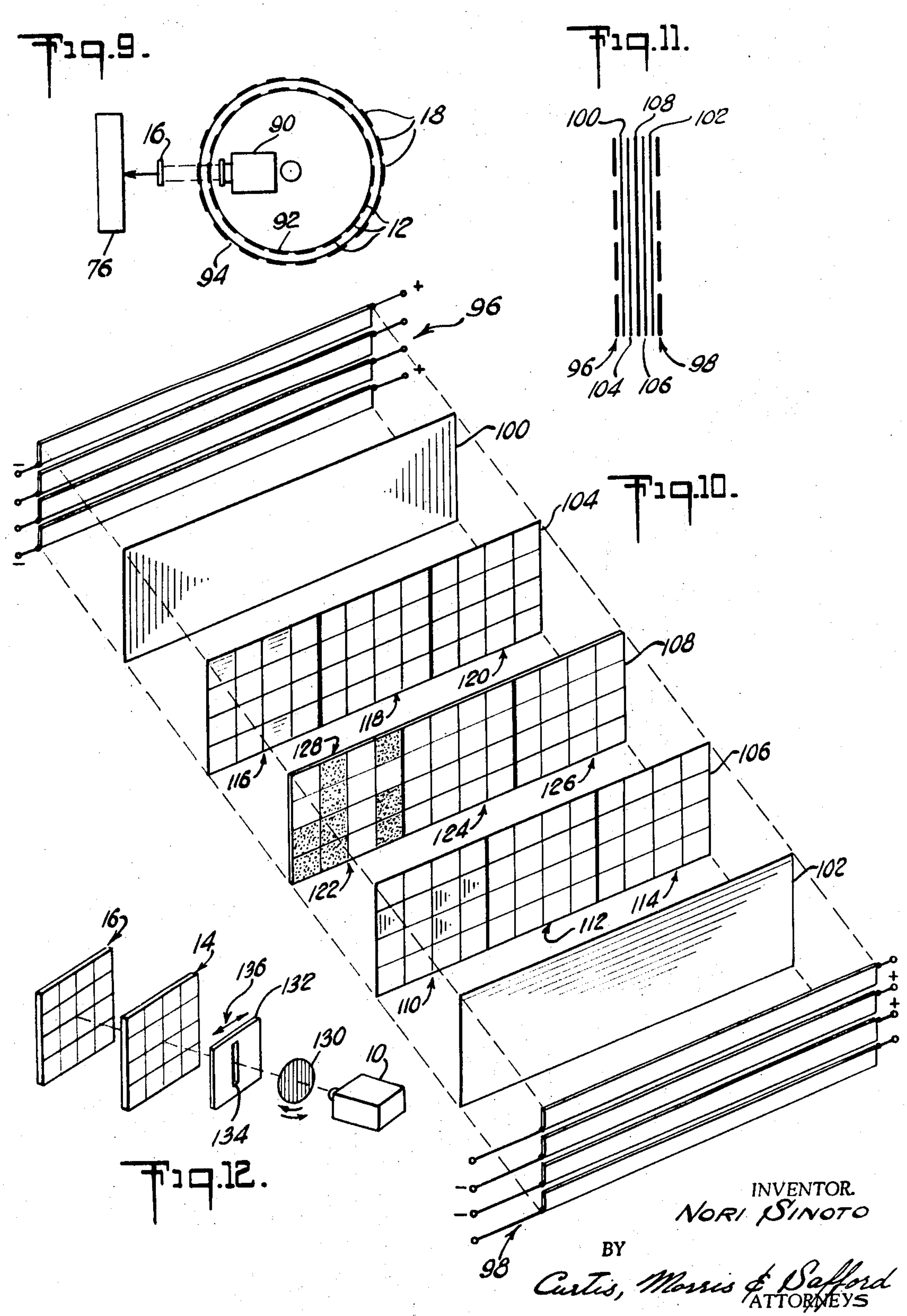
FIGURE 9 is a schematic view of a modification of the FIGURE 8 structure.
FIGURE 10 is an exploded perspective view of still another embodiment of the information storage and retrieval apparatus of the present invention.
FIGURE 11 is an assembled side elevation view of the arrangement shown in FIGURE 10.
FIGURE 12 is a perspective schematic view of still another embodiment of the information storage and retrieval system of the present invention.

The arrangement shown in FIGURE 9 is identical to the FIGURE 8 arrangement except that the information cells 18 are stored on the surface of another transparent drum 94 whose diameter is larger than that of drum 92 and which is rotatable independently from drum 92. Preferably, drum 92 is mounted within drum 94. Drum 94 is rotated past the stationary drum 92 to provide information cell scanning. One advantage of this arrangement is that by expanding the extent of the light projected by the projector 90, or by providing one or more additional projectors, light beams from two or more retrieval slides can be projected through the moving information cells simultaneously, thus identifying cells containing two or more key words with only one revolution of the information cell drum.

The embodiment of the invention shown in FIGURES 10 and 11 is like that shown in FIGURE 1 except that the projector and retrieval slide shown in FIGURE 1 are replaced by two sets 96 and 98 of four parallel "Panelescent Tape-Lites" sold by Sylvania Electric Products, Inc. and sheets 100 and 102 of "Polaroid" polarizing material. Each tape-light is a thin, tape-like light source which glows along its entire length when energized by an electric current. Each polarizing sheet polarizes the light from one of the sets of "Tape-Lites" along an axis different from the axis of the other sheet.

Another difference between the arrangement in FIGURES 10 and 11 and the FIGURE 1 device is that information is stored on two information cell sheets 104 and 106 instead of one. Each sheet 104 or 106 consists of squares of transparent material and squares of polarizing material all of which have a single polarization axis. The polarization on one sheet is opposite to that on the other so that if the sheets were placed face-to-face, an information cell like cell 18 would be formed in each of three regions, 116, 118, and 120 on sheet 104, and regions 110, 112, and 114 on sheet 106. Thus, sheets 104 and 106 together form three information cells. Only the cell formed by regions 110 and 116 has polarized regions marked in FIGURE 10, but it should be understood that in practice the other cells will have similar polarized areas.

Each of these information cell sheets may be produced by the "Vectograph" process mentioned above. Squares selected in accordance with the desired code are coated with plane polarizing material while other squares remain transparent. The polarization axis of sheet 100 is opposite to the polarization axis of the polarized squares on sheets 104, and the polarization of sheets 102 and 106 is similarly opposite.

Read-out board 108, which is shown schematically in FIGURE 10, operates in the same manner as board 16 described above, except that its photoconductive squares are responsive to light signals projected upon it from either side. It is divided into three read-out cells 122, 124 and 126 corresponding to the three information cells formed by sheets 104 and 106.

The embodiment shown in FIGURES 10 and 11 operates as follows:

The tape-light groups 96 and 98 are energized in accordance with the code representation for the information desired to be retrieved. The light emitted by each tape-light which is energized will be blocked by the polarized squares in sheet 104 or 106 which are in its path. Otherwise, light from the tape-lights will pass through the transparent regions of sheet 104 or 106 and will be transmitted onto read-out board 108. Shields can be used to insure that the light from each tape-light travels straight towards the read-out board 108.

The squares in read-out cell 122 which are illuminated in the particular information cell arrangement shown in FIGURE 10 are shown shaded while the areas upon which light does not shine are not shaded. Since the vertical column 128 of read-out cell 122 has all of its photoconductive elements illuminated, it would produce a read-out signal in accordance with the description accompanying FIGURE 5. An additional tape-light strip can be added to each array 96 and 98, another horizontal row of polarized squares can be added to sheets 104 and 106, and a corresponding additional row of photoconductive segments and circuitry can be added to read-out board 108 to provide operation in accordance with the disclosure accompanying FIGURE 13. By this arrangement, the electrical output signal can be coded to uniquely identify each information cell detected.

FIGURE 11 shows a cross-sectional view of the assembled components shown in FIGURE 10. The tape-lights in each array 96 or 98 may be permanently secured to its polarizing sheet 100 or 102, and information cell sheets 104 and 106 can be stored in roll form and fed in synchronism with one another between the read-out board 108 and polarizer sheets 100 and 102, in accordance with the devices shown in FIGURES 6 through 9.

One advantage of the arrangement shown in FIGURES 10 and 11 is that the need for separate retrieval slides and a separate mechanical retrieval scanning and projection system is eliminated; instead, it is necessary only to encode the electrical input signals to the tape-light arrays 96 and 98 in order to initiate retrieval of the desired information.

Another system which does not require individual retrieval slides is shown in FIGURE 12. The projector 10, information cell panel 14, and read-out board 16 are the same as those described above in connection with FIGURES 1 through 9 and 13 through 15. However, in place of individual retrieval slides, a rotatably-mounted plane polarizer 130 projects light onto a laterally-movable plate 132 having a vertical slit 134. The width of the slit 134 and the relative positioning of the projector 10, plate 132, and panel 14 is such that the beam of light reaching panel 14 preferably is wide enough to fully cover only one vertical column of elements on panel 14. The plate 132 is moved laterally, in the directions indicated by arrow 136, in order to sweep the beam of polarized light passing through plate 132 over all the columns of panel 14. The axis of polarization of this light beam is changed by rotating the polarizer 130 to different successive angular positions in accordance with the code representing a given item of information to be located.

If desired, the rotating polarizer 130 may be replaced by a Kerr cell or a Faraday cell, either of which has the ability to rotate its polarizing axis in response to electrical signals rather than by physical rotation. The operation of such Kerr and Faraday cells is fully described in the prior art.

One advantage of using cross-polarization of light in the invention is that the light "extinction" produced is very complete that is, almost all light transmission can be blocked by this means. In addition, the "extinction" function is such that small changes in relative angular alignment of two polarizers cause relatively large light transmission differences, thus making the matching of axes detectable with a high degree of precision.

A modification of the above-described embodiments can be made by using information and retrieval elements using the "Moire" effect rather than polarization of light to perform logic functions. For example, the polarizing squares, sheets and strips illustrated in the drawings can be replaced by transparent members having closely-spaced parallel lines on their surfaces. The parallel lines shown on the polarizing members in the drawings can be taken to represent such lines.

When light is shown through two of such parallel-lined members, the amount of light transmitted is a maximum when the lines on the members are parallel and superimposed whereas the light transmitted is a minimum when the lines are crossed at a 90° angle to one another. This variation of light transmission can be used in a manner like the polarization effect described above to perform logic functions for the system.

By the use of any one of the system embodiments described above, it is possible to locate randomly-stored information pertinent to a given subject in a unique manner. For example, it is possible to locate all the literature available in a specific library on a subject in which the researcher is interested. A dictionary can be compiled in which each word is given one or more coded numbers to represent it. A different number is given for each separate meaning of each word, with each separate meaning being explained in the dictionary. The code representation for each of these words and word-meanings is stored on an individual retrieval slide, or it can be input electrically to systems such as those shown in FIGURES 10 through 12. Each key (important) word of the title or description of an article in the library will be stored in one information cell in accordance with its code representation as given by the code dictionary.

The researcher looks up, in the code dictionary, the key words of the subject in which he is interested. For example, if he is interested in identifying all the available literature on "Colorado Gold Mining," he would first look up the code designation of the word "Colorado," select the slide with that code designation, or apply the proper electrical input to the electrical-input system described above, and scan the information cells in the manner described above to determine which of them contains a word having the "Colorado" code representation. He then repeats this process for the words "Gold" and "Mining." The information cells which are indicated to contain all three words then are noted and the literature they represent is requested from the librarian. Alternatively, the literature can be displayed and copied automatically in a microfilm reader-printer or the like.

Alternatively, the researcher can find the desired literature even faster by presenting all three slides to the information cells in the arrangements described above.

The above method for locating information is highly advantageous to the researcher. Since the information is stored in accordance with the various meanings of different words, the researcher can pinpoint with much greater accuracy the literature pertinent to his subject, thus avoiding the need for his examining large amounts of literature unrelated to his subject of research.

The above description of the invention is intended to be illustrative and not limiting. Various changes or modifications in the embodiments described may occur to those skilled in the art and these can be made without departing from the spirit or scope of the invention as set forth in the claims.

I claim:

1. Apparatus for storing and retrieving information, said apparatus comprising, in combination, an information storage unit comprising a plurality of information identification arrays each of which comprises an array of elements of light-polarizing material, the elements in each of said arrays being arranged in a coded pattern according to the direction in which light is polarized by each of said elements, and means for retrieving the information stored in said storage unit, said retrieving means including means for projecting polarized light upon the elements of each of said identification arrays with different light beams striking separate ones of said elements in each of said arrays, each of said beams being polarized in accordance with a coded pattern such that there is substantially equal transmission of light by all of the elements in each selected one of said arrays whose arrangement of elements corresponds to said coded pattern of polarization of said light.

2. Apparatus for storing and retrieving information, said apparatus comprising, in combination, an information storage unit comprising a plurality of information identification arrays each of which comprises an array of elements of light-polarizing material, the elements in each of said arrays being arranged in a coded pattern according to the direction in which light is polarized by each of said elements, means for retrieving the information stored in said storage unit, said retrieving means including means for projecting polarized light upon the elements of each of said identification arrays with different beams striking separate ones of said elements in each of said arrays, each of said beams being polarized in accordance with the coded pattern such that there is substantially equal transmission of light by all of the elements in each selected one of said arrays whose arrangement of elements corresponds to said coded pattern of polarization of said light, and means for detecting the presence in said information storage unit of each of said selected ones of said arrays and producing an electrical read-out signal in response to each such detection.

3. Apparatus for storing and retrieving information, said apparatus comprising, in combination, a plurality of information storage units each comprising a plurality of information identification arrays each of which comprises an array of elements of light-polarizing material, said elements being arranged in each array in a coded pattern according to the direction in which light is polarized by each of said elements, means for retrieving the information stored in said storage units, said polarized light being divided into retrieval beams each of which has a single direction of polarization and is projected upon a group of said elements each of which is correspondingly located in one of said arrays, the direction of polarization of each of said beams being determined in accordance with a retrieval code, and means for detecting each information storage unit in which an array appears which is coded in accordance with said retrieval code and for producing an electrical read-out signal in response to each such detection.

4. Apparatus as in claim 3 in which said projecting means includes a light-source projecting light through an information retrieval slide, said slide comprising light polarizing material having parallel elongated areas each having a single axis of polarization, each such area thus forming one of said beams of polarized light with each of said beams being projected upon a correspondingly-positioned one of said elements in each of said arrays in a plurality of said information storage units.

5. Apparatus as in claim 4 in which said coded pattern of arrangement of said storage unit elements is formed in accordance with a quaternary numbering system with the number represented by each of said elements being determined by the relative angle of the plane of light-polarization produced by said element.

6. Apparatus as in claim 3 in which each of said storage units is located on elongated flexible film adapted to be stored on reels and moved past an exposure station at which said retrieval beams are projected upon said storage units.

7. Apparatus as in claim 6 in which said projecting means including a light source projecting light through one of a plurality of information retrieval slides, each of said slides being adapted to provide polarization of the light from said source and project it upon at least one of said storage units, and including another elongated flexible film adapted to be stored on reels, each of said slides being located on said second film and being adapted to be moved sequentially between a light projector and said information units.

8. Apparatus as in claim 6 in which said projecting means includes a light source projecting light through one of a plurality of information retrieval slides, each of said slides being adapted to provide polarization of the light from said source and project it upon at least one of said storage units, and in which each of said slides is mounted on a peripheral surface of a retrieval drum rotatable to bring said slides sequentially between a light projector and said information units.

9. Apparatus as in claim 3 in which said projecting means includes a light source projecting light through one of a plurality of information retrieval slides, each of said slides being adapted to provide polarization of the light from said source and project it upon at least one of said storage units, and in which each of said information units is borne upon a peripheral surface of an information storage unit drum which is rotatable to move said storage units past an exposure station in which said retrieval beams are projected sequentially upon said storage units.

10. Apparatus as in claim 9 in which said drums are of different diameters and are mounted in concentric relation to one another.

11. Apparatus, for storing and retrieving information, said apparatus comprising, in combination, an information storage unit comprising a plurality of information identification arrays each of which comprises an array of elements each of which constricts light to passage through it in elongated parallel planes, said elements being arranged in a coded pattern according to the direction of the planes in which light is constricted by said elements, and means for retrieving the information stored in said storage unit, said retrieving means including means for projecting retrieval light beams constricted to passage in elongated parallel planes upon said arrays, each of said beams having a single direction in which its light is constricted and being projected upon a group of said elements each of which is correspondingly located in one of said arrays, the direction of constriction of light in each of said beams relative to the direction of constriction of the other of said beams being determined by a preselected retrieval code.

12. Apparatus as in claim 11 in which each of the recited light-constricting elements is a light-polarizing element, and in which the constriction of said retrieval light beams is accomplished by polarization.

13. Apparatus as in claim 12 in which said projecting means comprises a light projector, a light-polarizing retrieval element intercepting the light emitted by said projector, said polarizing retrieval element being adapted to rotate its polarization axis to multiple different angles in a timed sequence in accordance with a retrieval code, an opaque member with a slit in it, said slit being adapted to pass through it a single beam of polarized light of a width to fully cover only a single one of said correspondingly located storage elements in each of said arrays, and being adapted to move across said arrays to project said single beam sequentially upon other ones of the elements in each of said arrays.

14. Apparatus as in claim 12 in which said projecting means includes at least one group of parallel elongated strip-like lamps, said lamps being adapted to be energized in accordance with a retrieval code, and means for polarizing the light emitted from each of said lamps to form said retrieval beams.

15. Apparatus as in claim 14 including a pair of said lamp groups, each lamp group having means for polarizing the light emitted by said lamps, said information storage unit comprising a pair of members each having both transparent elements and arrays of elements which polarize light in one axis, the polarizing elements on one of said members all polarizing light in one axis which is different from the axis of polarization of the elements in the other of said members, the polarizing elements of both of said members, when taken together, being formed in said coded pattern, the light transmitted by said members being projected upon a read-out member adapted to decode the pattern of light it receives.

16. Apparatus as in claim 11 including means for detecting the presence in said information storage unit of an array having an arrangement of elements coded in the same manner as the arrangement of said retrieval beams and for producing a coded electrical read-out signal in response to said detection.

17. Apparatus as in claim 16 in which said detecting and read-out signal-producing means includes a read-out cell positioned so as to reecive light transmitted through said information storage unit, said read-out cell comprising a plurality of arrays of photoconductive segments, each positioned to intercept the light transmitted by one of said storage unit arrays, and means for producing said electrical read-out signal in response to the attainment of maximum illumination of each segment of at least one of said segment arrays.

18. Apparatus as in claim 11 including means for detecting each information storage unit in which appears an array which is coded in accordance with said retrieval code and for producing an electrical read-out signal in response to each such detection, in which said detecting and read-out-producting means includes a read-out cell positioned so as to receive light transmitted through said information storage unit, said read-out cell comprising a plurality of arrays of photoconductive segments, each positioned to intercept the light transmitted by one of said storage unit arrays, and means for producing said electrical read-out signal in response to the attainment of maximum illumination of each segment of at least one of said segment arrays, said read-out signal-producing means including at least one other photoconductive segment array for encoding said read-out signal to produce a binary or higher-order encoded read-out signal.

19. Apparatus as in claim 18 in which said information storage unit includes at least one additional array of said light-constricting elements, said additional array being adapted and positioned to project the light it transmits onto said other photoconductive segment array, the arrangement of said elements in said additional array being in accordance with an identification code to identify said information storage unit, and means for projecting a beam of light polarized in a single axis through said additional array of light-constricting elements.

20. Apparatus as in claim 19 including a plurality of said storage units, each having an additional array of elements coded in a pattern unique to that storage unit, in which each of the recited light-constricting elements is a light-polarizing element, in which the constriction of said retrieval light beams is accomplished by polarization, and in which said projecting means includes a plurality of retrieval slides and a light source adapted to project light through said slides, each of said slides comprising light polarizing material having parallel elongated areas each having a single axis of polarization, each such area thus forming one of the beams of polarized light, each of said slides including an additional elongated area adapted to polarize light in one axis and project that light through said additional array of elements in each of said storage units.

21. Apparatus as in claim 18 in which each photoconductive segment of said other segment array is electrically connected in series with the parallel combination of the first-named segment arrays in a voltage-divider arrangement, a separate impedance connected in series with each segment of said other segment array, means for applying an electrical signal across the series combination so formed, a plurality of electrical leads each connected to the junction between one of said impedances and its associated segment, and means for producing a parallel-coded digital electrical output signal whose coding corresponds to the attainment or failure of attainment of a pre-set voltage on said electrical leads.

22. Apparatus as in claim 11 in which said projecting means includes a plurality of retrieval projection slides and a light source, and including means for simultaneously projecting light through a plurality of said slides, a plurality of said storage units, and means for sweeping said storage units through the retrieval light beams emanating from said slides.

23. Apparatus for storing and retrieving information, said apparatus comprising, in combination, a plurality of information storage units each comprising a flexible film segment forming a plurality of information identification arrays each of which comprises an array of elements of light-polarizing material, said elements being arranged in each array in a coded pattern according to the direction in which light is polarized by each of said elements, said pattern being formed in accordance with a quaternary numbering system with the number represented by each of said elements being determined by the relative angle of the plane of light-polarization produced by said element, flexible elongated film backing adapted to be stored on reels, each of said storage segments being releasably fastened into an aperture in said backing, means for retrieving the information stored in said storage units, said polarized light being divided into retrieval beams each of which has a single direction of polarization and is projected upon a group of said elements each of which is correspondingly located in one of said arrays, the direction of polarization of each of said beams being determined in accordance with a retrieval code, said projecting means including a light source projecting light through one of a plurality of information retrieval slides, each of said slides being adapted to provide polarization of the light from said source and project it upon at least one of said storage units so that said polarized light is divided into retrieval beams each of which has a single direction of polarization and is projected upon a group of said elements each of which is correspondingly located in one of said arrays, the direction of polarization of each of said beams being determined in accordance with a retrieval code, and means for detecting each information storage unit in which an array appears which is coded in accordance with said retrieval code and for producing an electrical read-out signal in response to each such detection.

24. A method for storing information and retrieving said information on the basis of its pertinence to a preselected subject, said method comprising the steps of encoding each key word describing the subject to which an item of information pertains, storing each of said encoded words for said item of information in an information storage unit in the form of light-polarizing elements, encoding each key word of said information in the form of light-polarizing elements forming a retrieval unit, and retrieving said information by projecting light through said elements of said retrieval unit and onto said information storage unit in a manner such that each information storage unit containing an encoded key word having the same code designation as that of said retrieval unit is identified.

25. A method as in claim 24 in which each of the different meanings for a given key word are encoded the same as if it were itself a key word.

26. A method as in claim 24 in which light is projected simultaneously through the light-polarizing elements of a plurality of said retrieval units, each of said retrieval units representing one key word of said information.

References Cited

UNITED STATES PATENTS

| | | | |
|---|---|---|---|
| 2,928,075 | 3/1960 | Anderson | 340—173 |
| 3,235,631 | 2/1966 | Shelanski | 350—153 X |
| 3,296,594 | 1/1967 | Van Heerden | 340—173 |
| 3,328,563 | 6/1967 | Kollar | 235—61.115 |

BERNARD KONICK, *Primary Examiner.*

J. F. BREIMAYER, *Assistant Examiner.*